Sept. 5, 1933.  E. A. NELSON  1,925,596
BRAKE
Filed Feb. 7, 1929  4 Sheets-Sheet 1

INVENTOR
Emil A. Nelson
BY
Harness, Dickey and Pierce
ATTORNEYS

Sept. 5, 1933.　　　　　　E. A. NELSON　　　　　　1,925,596
BRAKE
Filed Feb. 7, 1929　　　4 Sheets-Sheet 2

INVENTOR
Emil A. Nelson
BY
Harness, Dickey and Pierce
ATTORNEYS

Sept. 5, 1933.  E. A. NELSON  1,925,596
BRAKE
Filed Feb. 7, 1929   4 Sheets-Sheet 4

INVENTOR
Emil A. Nelson
BY
Harness, Dickey and Pierce
ATTORNEYS

Patented Sept. 5, 1933

1,925,596

UNITED STATES PATENT OFFICE 1,925,596

BRAKE

Emil A. Nelson, Detroit, Mich.

Application February 7, 1929. Serial No. 338,087

25 Claims. (Cl. 188—78)

This invention relates to brakes, and particularly that type thereof applicable for use in connection with motor vehicles, the principal object being the provision of a new and novel form of brake mechanism.

Another object is to provide a novel method of assembling certain parts of a motor vehicle whereby greater economy in assembly will result.

Another object is to provide a novel method of assembly for a brake drum and cooperating brake mechanism to a vehicle axle or axle assembly.

Another object is to provide a brake mechanism that may be operatively positioned with respect to a cooperating brake drum before the drum is applied to the motor vehicle, and thereafter applied as a unit with the drum to the vehicle.

Another object is to provide a brake mechanism that may be positioned within the brake drum secured to a wheel, and thereafter be applied to a motor vehicle with the wheel, and secured in place without the necessity of subsequent adjustment of the brake elements with respect to the drum.

Another object is to provide a vehicle brake drum of new and novel construction.

Another object is to provide a brake drum for vehicle brakes of the internal expanding type, the drum being formed in the shape of a channel sectioned rim and vented supporting member.

Another object is to provide a brake drum comprising an outwardly opening channel sectioned rim and a sheet metal supporting plate formed to provide a plurality of spaced arms welded or otherwise secured thereto.

Another object is to provide a vehicle brake comprising a drum having an outwardly opening channel sectioned rim portion and an internal expanding brake member fitting around the channel.

Another object is to provide a brake element of the internal expanding flexible type formed of a generally channel shaped member.

Another object is to provide a brake element for an internal expanding type of brake comprising a generally circular member of channel shape section, the marginal edges of which are split to impart flexibility to the member.

Another object is to provide a brake element for a brake of the internal expanding type comprising a generally circular member of channel shape section, the marginal edges of which are slotted at substantially increasing distances from one end thereof, whereby to provide a brake element of varying degrees of flexibility throughout its length.

Another object is to provide a new and novel type of brake actuating mechanism.

Another object is to provide a brake mechanism of the internal expanding wrapping type provided with a flexible brake element, means being provided for moving the brake element into contact with the drum at a point spaced from the free end thereof in advance of contact of the free end with the drum.

A further object is to provide a brake mechanism having certain novel features of construction which will be specifically pointed out, or will be obvious, in the following specification.

The above being among the objects of the present invention, the same consists in certain novel features of construction, combinations of parts, and method of application to a vehicle, to be hereinafter described with reference to the accompanying drawings, and then claimed, having the above and other objects in view.

In the accompanying drawings which show a suitable embodiment of the present invention, and in which like numerals refer to like parts throughout the several different views.

The conventional method of applying brake mechanism to a motor vehicle in production is to apply such mechanism as is commonly supported on the axles to the axles or axle parts previous to the assembly of such axles or axle parts to the vehicle, and after assembly of such parts to the vehicle, to thereafter apply the brake drums, which are sometimes applied as an integral part of the wheel assembly and sometimes separate therefrom. In either case it is necessary, after the drum is applied, to adjust the brake mechanism so as to bring the brake elements into proper operative relationship with respect to the drum, that is, so that they have the proper clearance with respect to the drum when they are in inoperative position, and are moved into engagement with the drum in the proper manner and with full contact therewith when in operative position. This operation is relatively long and tedious and relatively expensive, particularly where the drum is secured to the wheel as an integral part thereof previous to assembly of the wheel to the vehicle.

The present invention provides a construction in which a brake mechanism is provided which may be assembled relative to the brake drum previous to the assembly of the brake drum to the vehicle, and this regardless of whether or not the brake drum is an integral part of the wheel structure or not. Furthermore, the construction permits of positioning the assembled brake mechanism relative to the drum and subsequent assembly of the drum and brake mechanism to the axle without requiring or necessitating subsequent adjustment of the brake elements relative to the brake drum, the only requirement being the subsequent connection of the operating lever on the brake mechanism with the connecting rod or other member moved by the operator of the vehicle when applying the brakes.

While I have shown a novel form of brake mechanism, particularly applicable to such a method of assembly, and which brake mechanism is in itself of new and novel construction and is a part of the present invention, in the broad aspect of the present invention the particular formation of the brake mechanism is relatively unimportant so long as it is constructed to permit the method of assembly herein described.

Referring to the accompanying drawings and particularly to Figs. 1 to 4 inclusive, I show a front axle 30 to the end of which is connected by the pin 31 the yoke 32 of a wheel spindle 33, as in some conventional forms of steering wheel structures. A hub 34 may be mounted on the spindle 33 in the conventional manner, the hub 34 being provided with a radial flange 35 to which a brake drum and a wheel may be secured by bolts such as 36 in a conventional manner, although it is to be understood that any suitable means may be provided for securing the drum and wheel to the hub. The wheel shown in the drawings is illustrated as a disc wheel 37. The brake drum is shown as comprising a rim portion 38 of channel section opening radially outwardly of the wheel and provided with out-turned marginal flanges 39. The rim portion 38 is supported from the hub 34 by means of a supporting member such as 40, best shown in Fig. 2, formed of sheet metal to provide four outwardly extending arm portions 41, the outer ends of which are welded to the outer edge of the outer marginal flange 39. The edges of the arm portions 41 are bent over as at 42 to impart lateral stiffness to the structure. This construction provides means whereby the air may be readily circulated through the brake mechanism and thereby act to dissipate the heat generated by the frictional contact of the brake elements with the drum during application of the brake, thus minimizing possibility of distortion of the brake elements due to overheating of the same. The inner portion of the member 41 is shown as being clamped against the flange 35 of the hub 34 by the inner portion of the disc 37 of the wheel, it being readily understood however, that other means may be equally well employed.

Figure 1:
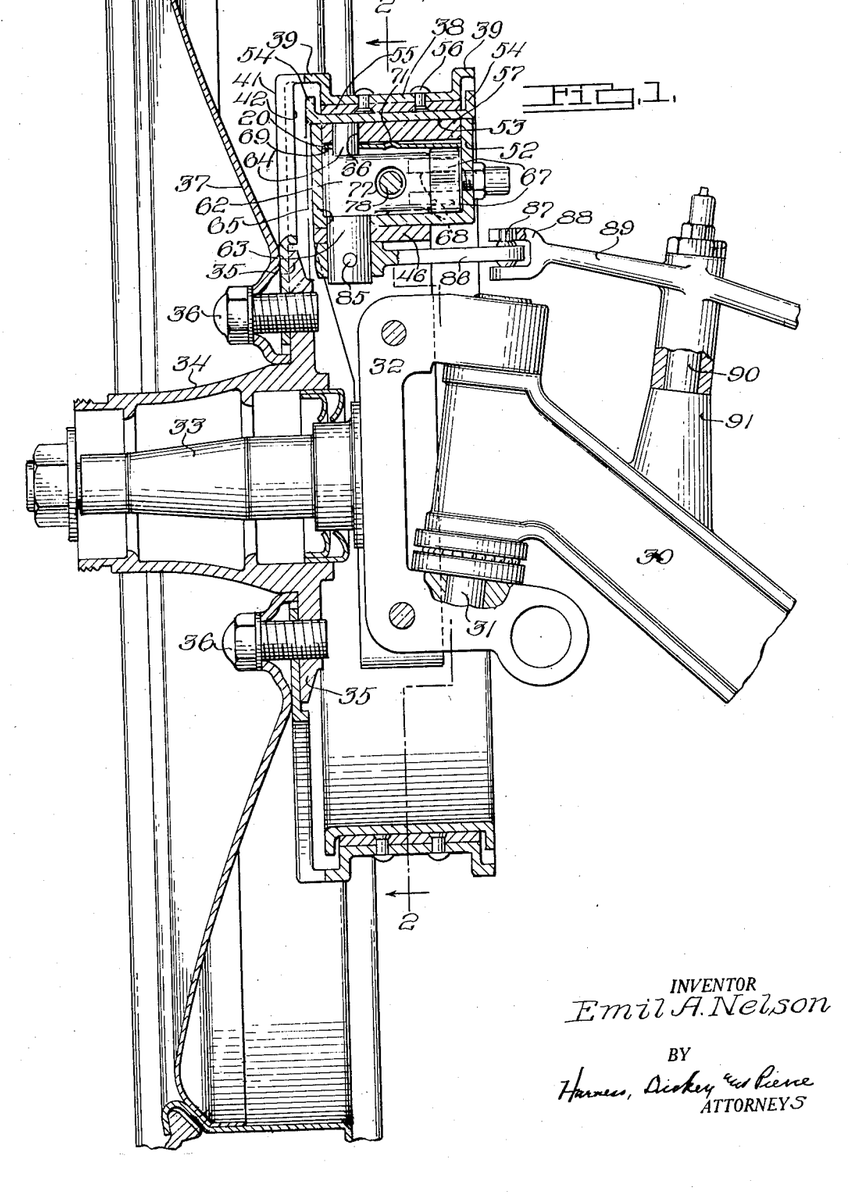
Fig. 1 is a fragmentary vertical sectional view taken through the axis of a front or steering wheel of a motor vehicle in connection with which a brake mechanism is employed.
Figure 2:
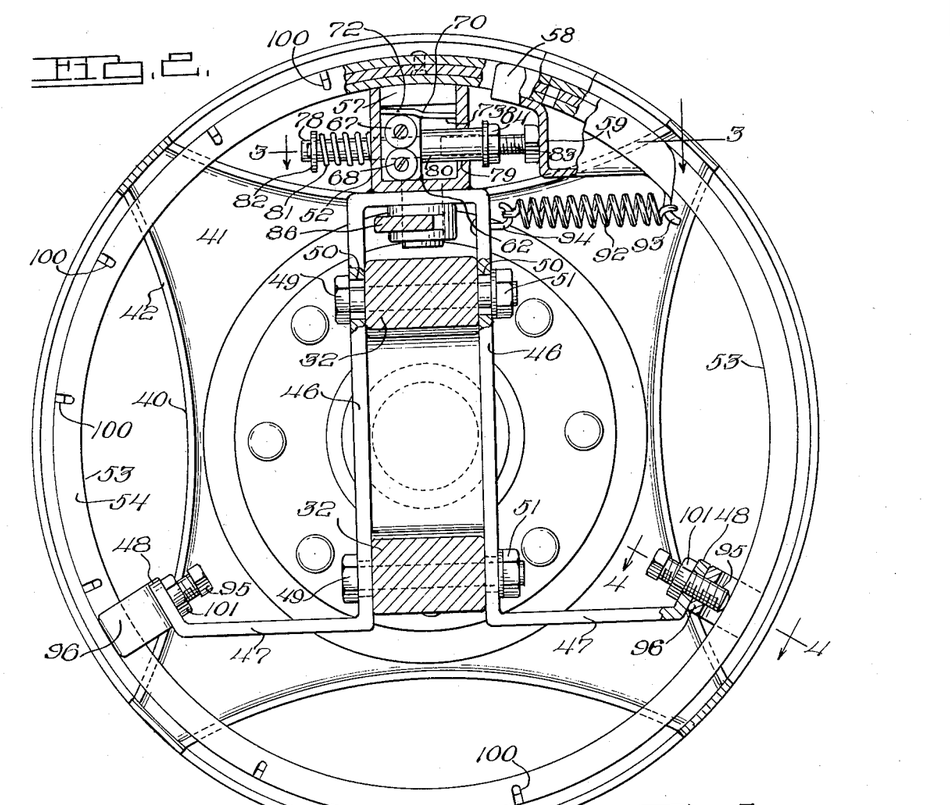
Fig. 2 is a vertical sectional view of the brake mechanism taken on the line 2—2 of Fig. 1.
Figure 3:
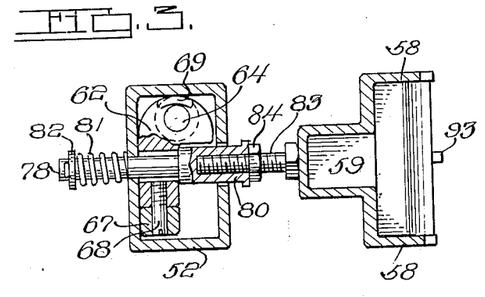
Fig. 3 is a sectional view taken on the line 3—3 of Fig. 2.
Figure 9:
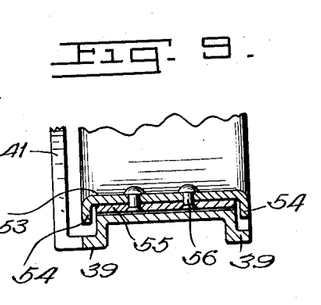
Figure 9 is a fragmentary sectional view taken as on the same line as Fig. 1 and showing a modified manner of applying the brake lining.

Referring to Fig. 2, it will be noted that the sides of the yoke 32 are machined off in flat and parallel relationship. An inverted U-shaped member 46 fits over the yoke 32 and its lower ends are bent outwardly as at 47 and then upwardly as at 48, for a purpose which will be presently described. Bolts such as 49 passing through elongated openings 50 in the member 46 and through the arms of the yoke 32 are drawn up by cooperating nuts 51 to clamp the member 46 to the yoke 32. To the upper end of the member 46 is secured, by welding or the like, a box-like member 52 having an open top. A brake element comprising a flexible band-like member 53 having out-turned marginal edges 54 is positioned within the brake drum, the edges being spaced from each other a slightly greater amount than the width of the channel portion 38 of the brake drum, so that the edges 54 somewhat overlap the sides of the channel portion 38 in a radial direction when in assembled position. This results in a construction in which the braking surfaces between the band and drum are efficiently protected from contact with water, dirt, grease or other foreign matter, and consequently less trouble from these causes is experienced in the present brake. This is further aided by the relatively open construction of the drum supporting plate which permits such foreign matter to be quickly thrown out of the drum. A friction lining such as 55 is of course employed, and may be secured either to the brake element 53 or to the drum 38, it being shown as secured to the drum 38 by rivets such as 56. I prefer to secure the lining 55 to the drum 38 as shown in Figs. 1 and 2 rather than to the band 53, as shown in Fig. 9, in order to realize certain advantages that may thereby be realized and which advantages will hereinafter be explained. The brake element or band 53, which is of the split wrapping type, has secured thereto adjacent one end thereof an inwardly extending block member 57 which is relatively closely but slidably received in the open end of the box member 52, as indicated in Figs. 1 and 2. This block member 57 acts to anchor the corresponding end of the band member 53 against circumferential movement. The opposite end of the band 53 has secured thereto a stamped member, best shown in Figs. 2 and 3, and formed to provide a pair of flanges 58 adapted to embrace the sides of the band 53, and a portion 59 acting as an abutting surface for a part of the brake actuating mechanism, as will hereinafter be described. This stamped member is so positioned that the flanges 58 bridge the line of split of the band 53 and are rigidly secured to the free end of the band and slidably embrace the anchored end of the band 53. The flanges 58 thereby act to maintain the free end of the band in alignment with the anchored end thereof while permitting free movement of the free end.

The expanding means is constructed as follows: A member 62 having inwardly and outwardly extending pin portions 63 and 64 respectively is positioned within the box-like member 52, the pin 63 projecting down through the opening 65 in the lower wall thereof in which it is rotatably received and which is positioned adjacent the outer edge of the box. The pin 64 is rotatably and slidably received in an aligned opening 66 provided in the block 57. The member 62 extends inwardly from the axes of the pins 63 and 64, and at its inner edge, within the box, is provided with a pair of vertically aligned contacting rollers 67 rotatably mounted on pins 68. These rollers are positioned so that the lower one thereof bears against the bottom of the box member 52, and the upper roller is normally spaced from the lower face of the block 57. The outer end of the member 62 is provided with an upstanding projection 69 between which and the lower face of the block 57 is positioned the outer end of a spring member 70 which fits around the pin 64 and extends therefrom to adjacent the inner end of the box member 52. The spring member 70 is provided with an upstanding projection 71 thereon adjacent its center which bears against the under side of the block 57. The inner end of the spring member 70 bears against the upper surface of the upper roller 67. The spring member 70, in end view, at the point where it is adapted to contact with the roller 67, is formed to provide two connected portions 72 and 73 positioned out of horizontal alignment with each other, the upper roller 67 lying in contact with the portion 72 positioned closer to the block 57 when the brake is in inoperative position.

The member 62 is provided with an opening 77 therein extending perpendicular to the axes of the pins 63 and 64 in a plane parallel to the plane of the wheel 37, and extending through the opening 77 and through the rear wall of the box 52 is a pin member 78 having an enlarged end 79 which slidably projects through the forward wall of the box member 52. A shoulder 80 is formed at the junction of the portions 78 and 79 and this shoulder is constantly urged against the forward face of the member 62 by means of a spring 81 held under compression between the outer rear face of the box member 52 and a washer 82 secured against movement to the outer end of the pin 78. The forward end of the portion 79 of the pin is internally threaded in axially parallel relationship and receives therein a bolt member 83 locked in adjusting position by means of a nut 84. The head of the bolt 83 is adapted to bear against the wall 58 of the stamped member on the free end of the brake band 53.

Secured to the lower end of the pin 63 below the upper surface of the member 46 by means of a cross pin such as 85, is a lever 86 which extends inwardly between the sides of the member 46. This lever may be operated in any suitable manner, but as shown is provided with a pair of oppositely extending pins 87 received in the forked end 88 of the lever 89 mounted on the pin 90 secured in the boss 91 formed on the axle 30, the opposite end of the lever 89 being of course connected by suitable linkages (not shown) to the brake operating pedal. It will be noted that the pins 87 swing through the axis of the king pin 31 during the application of the brake, and the path of contact between the pins 87 and the end 88 of the lever 89 is substantially equally disposed on either side of the axis of said king pin during such brake application. Further, because the axes of the levers 89 and 86 lie in substantially parallel relationship so that the levers lie and move in substantially the same horizontal plane, turning of the wheel about the king pin for the purpose of steering has substantially no effect on the brake action.

Figure 4:
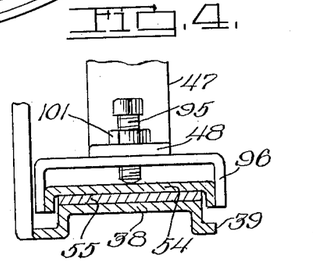
Fig. 4 is a fragmentary sectional view taken on the line 4—4 of Fig. 2.

A coil spring 92 held under tension between the hook 93 formed on the stamped member at the free end of the brake band 53 and the hook 94 carried by the U-shaped member 46, acts to maintain the free end of the brake band 53 out of engagement with the brake drum. Other such springs may be employed if necessary or desirable, to maintain other portions of the brake band 53 out of contact with the brake drum at places where it is liable to rub thereon. Stop screws 95 threaded through the bent ends 48 of the member 46 are provided to limit the inward contraction of the brake band 53 at the points where they are positioned. U-shaped members 96 carried by the ends 48 embrace the sides of the band 53 at those points to maintain the band 53 in proper axial position as indicated in Fig. 4. The operation of the brake is as follows:

Considering the various elements of the brake as being positioned in their non-braking positions as indicated in Figures 1 to 4 inclusive, when it is desired to apply the brake the operator depresses the usual pedal or other operating member (not shown), which causes the right hand end of the lever 89 to move rearwardly about the axis of the pin 90 and the left hand end of the lever 89, as indicated in Fig. 1 forwardly, carrying with it the pins 87 and the free end of the lever 86, and causing the pin 63 and member 62 to swing accordingly. The rollers 67, as viewed in Fig. 2, are thus caused to move to the right, and in so moving, the rollers 67 pass from the portion 72 of the spring member 70 to the portion 73 thereof. In so passing from the portion 72 to the portion 73, the right hand end of the spring member 70, as viewed in Fig. 1, is lifted, and this lifting movement is transmitted to the block 57 through the projection 71 on the spring member and causes the block 57 to be moved upwardly in the box 52 and causes the anchored end of the band 53 to be resiliently pressed against the lining 55 carried by the brake drum 38. While this action takes place, the member 62 in swinging as described and, abutting against the shoulder 80, moves the end 79 of the pin 78 to the right as viewed in Fig. 2, and the screw member 83 acts to force the free end of the band 53 outwardly. The relation of the various parts is preferably such that the anchored end of the band is moved and contacts with the friction lining 55 while the pin 78 is moving the free end of the band 53 to take up the clearance between the remaining parts of the brake band 53 and the friction lining 55, so that in all cases that portion of the band at the block 57 moves into contact with the drum in advance of contact between the brake element and brake drum over any other portion thereof. Thereafter upon further swinging movement of the member 62 the brake band 53 is forced into firm full contact with the drum to exert a braking effect thereon. Upon release of the applying pressure the spring 92, and any other such springs that may be employed as previously described, will cause the various parts to resume their non-braking position as indicated in the drawings.

It is desirable that in accordance with the thought of moving the anchored end of the band 53 into contact with the drum previous to the contact of the remainder of the band with the drum, that the brake band 53 should act to contact with the drum upon application of the brake progressively from the block 57 to the free end of the brake band. The arrangement of the parts may ordinarily be so governed that this action takes place, but where any difficulty arises in carrying out this progressive contact of the brake band with the brake drum, it may be aided by making the brake band or other brake element progressively more rigid from the block 57 around the brake band to the free end thereof. One method of accomplishing this varying degree of flexibility of the band 53 is indicated in the drawings, and particularly in Fig. 2, in which the marginal flanges 54 of the brake band 53 are slotted as at 100 from the block 57 to the free end of the band 53, the distance between adjacent slots 100 increasing from the block 57 to the free end of the band 58 whereby the band 53 is relatively more resistive to bending at the free end thereof than at the anchored end thereof.

The reason for securing the friction lining 55 to the drum 38 rather than the band 53 may be noted at this point. Where a single brake element of the wrapping band type is employed internally as shown in the drawings, the band upon being heated from application of the brake, tends to elongate and take up the clearance between itself and the drum, resulting in less pedal movement being required to set the brake. The advantages of this construction have been recognized, but due to the fact that in the constructions heretofore used the manner in which the band has been moved into contact with the drum has prohibited the realization of these advantages, and in fact it has resulted in a disadvantage in such cases the lining has always been secured to the band, which thereby insulates it from the heat generated in braking and acts to hold it at a substantially constant length. In the present construction, due to the progressive contact of the band with the drum during application of the brake, the disadvantages resulting in the heretofore proposed constructions are eliminated, and full benefit of the advantages can therefore be realized.

The preferable method from the production standpoint of applying this brake mechanism to a motor vehicle is as follows: The U-shaped member 46 with the various parts of the brake mechanism described mounted thereon is applied to the brake drum 38, it of course being apparent that the screw member 83 and adjusting screws 95 are backed off during such application to the drum in order to permit the application. The lever 86 is then moved over towards or even against the right hand side of the member 46 as indicated in Fig. 2, and a wooden wedge or other member is driven in between the left hand side of the member 46 and the left hand edge of the lever 86 so as to move and maintain the lever 86 in brake applying position. The screw 83 is then threaded outwardly until the brake band 53 is in firm and brake applying relationship with respect to the brake drum, after which the lock nut 84 is secured in position. The clearance adjusting screws 95 are then positioned for proper clearance of the brake band 53 with respect to the brake drum when the brake drum is in inoperative position and are locked in such position by the lock nuts 101. The brake mechanism is thereby positioned in the brake drum in brake applying position. The brake drum, whether individually or as a component part of the wheel assembly, is then applied to the vehicle, the U-shaped member embracing the yoke end 32 of the axle, the bolts 49 are inserted in place, and are drawn up by the nuts 51. Due to the fact that the openings 50 in the member 46 through which the bolts 49 project are enlarged, the member 46 is capable of being secured to the axle within a relatively wide range of positions relative to the axle. The various parts of the brake mechanism are thereby applied and secured to the axle or axle part through which they are supported, in centered condition relative to the brake drum, so that thereafter when the wedge referred to above is removed from between the lever 86 and the side of the member 46, the brake mechanism may return to its inoperative position with proper clearance in respect to the drum, and upon reapplication of the brake, the brake band and brake drum will engage in the proper cooperating relationship, and this has been accomplished without the necessity of any adjusting of the brake elements after their assembly to the axle or axle part. The only connection necessary in the construction described after the bolts 49 have been inserted in place and secured, is the connection between the levers 86 and 89, if such has not been made previously.

It will thus be seen that with this construction, final adjusting of the brakes may be made when the brakes are applied to the drums and previous to assembly of the drums to the vehicle. The obvious greater ease of adjustment of brakes when forming a part of a small unit such as the drum and brake, or the drum and brake together with the wheel, instead of an integral part of a whole vehicle, is a material advantage, and one that effects a material saving in time and labor.

In the construction shown in Figs. 1 to 4 inclusive the application is that of a front wheel brake for a motor vehicle, and is shown as a full wrapping type primarily effective during forward movement of the vehicle, and consequently of lesser effectiveness for braking purposes when the vehicle is moving rearwardly. This is conventional practice, inasmuch as seldom, if ever, a vehicle braking system is required to be of great efficiency in backing up because of the lesser speeds encountered in such backing up operations. However, if both forward and rearward brakes were made of the full wrapping type primarily effective only during forward movement of the car, considerable dissatisfaction would arise because of the lack of braking effect apparent in backing up operations. Consequently, it is desirable that the rear brakes be effective both during forward and rearward movements of the vehicle. The above described brake mechanism may be modified to meet this condition when applied to the rear wheels of a motor vehicle, and still be so designed as to permit the same ready application to the vehicle in production.

Figure 5:
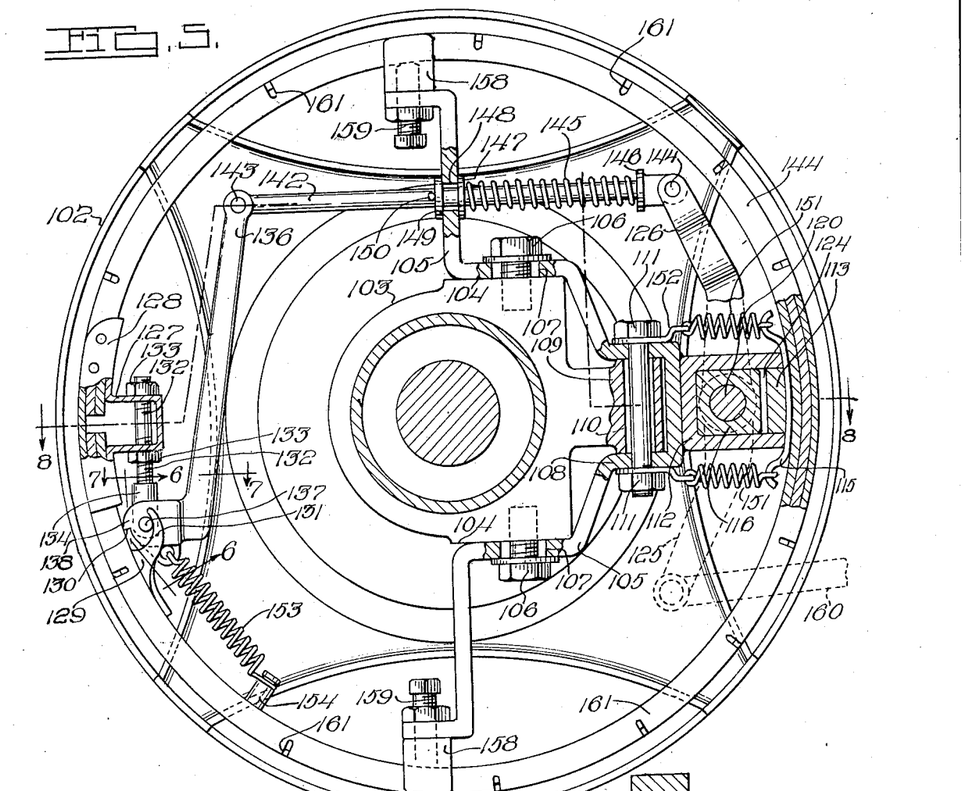
Fig. 5 is a fragmentary partially broken side view of a modification of the brake mechanism shown in the previous views, and showing it applied to the rear wheel of the motor vehicle.
Figure 8:
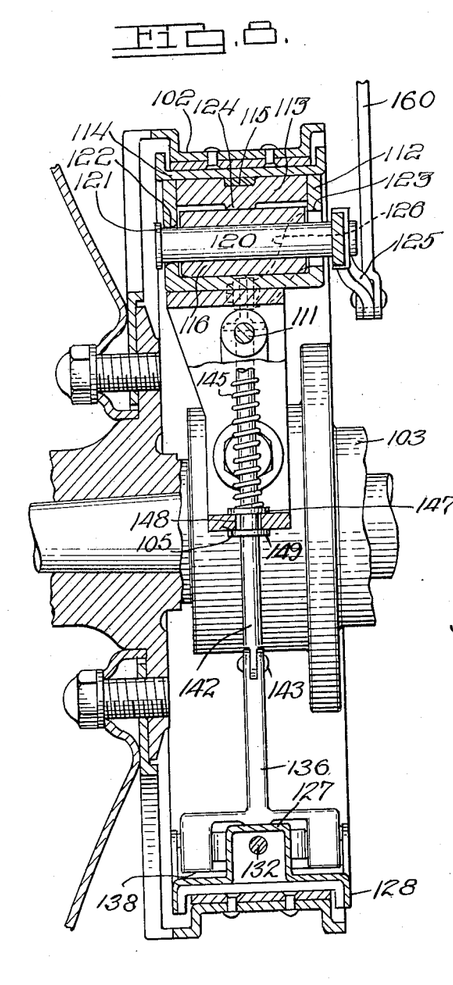
Fig. 8 is a sectional view taken as on the line 8—8 of Fig. 5.

Referring to Fig. 5, it will be seen that a brake drum 102 of the same general construction as the brake drum previously described is employed. The rear axle housing 103 is formed to provide a pair of supporting surfaces 104 upon which the brake supporting member 105 may be adjustably secured by means of bolts such as 106 extending through enlarged openings 107 therein and which act to clamp the member 105 to the surfaces 104. The member 105 is of a modified generally U-shape and is provided at the right hand or forward end, as viewed in Fig. 5, with a lesser U-shaped portion 108 which is adapted to embrace an extended supporting member 109 provided with an enlarged opening 110 therein in which a bolt 111 is received to clamp the portion 108 to the portion 109. Secured to the forward face of the portion 108 is a box-like structure 112 similar in construction to the box 52 previously described, and in the outer end of which is slidably received a block 113 similar to the block 57 previously described. The brake band 114 is of the same general construction as the brake band 53 and is secured to the block 113 midway between its ends, a spring fastening member 115 being preferably interposed between the two members for a purpose which will hereinafter be apparent. Slidably positioned within the box 112 between the block 113 and the bottom of the box is another block member 116, and projecting through the block 116 as best indicated in Fig. 8, is a rotatable pin 120, the outer end of which is provided with a head 121. The pin 120, where it projects through the outer side of the box 112, is received in an opening 122 formed to permit a limited swinging movement of the pin 120 relative to the opening, and the inner wall of the box 112 through which the inner end of the pin 120 projects is provided with an elongated opening 123 in which the inner end of the pin has a relatively large amount of freedom in a forward and rearward direction. The block 113 is formed with a central vertically extending rib 124 on its inner surface approximately midway between its ends, the surface of this rib being rounded and bearing against the block 116. The outer end of the pin 120 has rigidly secured thereto a double armed lever member having a downwardly extending arm 125 and an upwardly extending arm 126 which extends upwardly over the box 112 and then is bent inwardly so that its free end lies approximately centrally of the brake drum 102.

Figure 6:
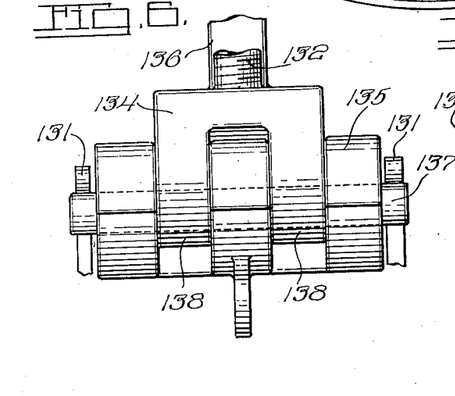
Fig. 6 is a view taken as on the line 6—6 of Fig. 5 showing the construction of the brake expanding means in Fig. 5.
Figure 7:
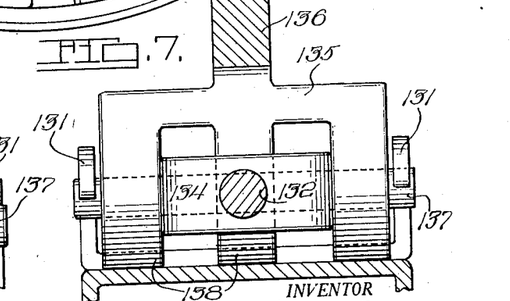
Fig. 7 is a view taken as on the line 7—7 of Fig. 5.

At the free ends of the band 114 a stamped member 127 of the same general nature as the stamped member at the free end of the band 53 previously described, is provided, it having outwardly extending marginal flange portions 128 embracing both sides of both ends of the band 114 and being rigidly secured by welding or otherwise to the upper free end of the band and slidably embracing the lower free end of the band. The lowermost band end is further provided with a stamped or other member 129 rigidly secured thereto, which provides an abutment 130 and a pair of inwardly and upwardly projecting spaced fingers 131. A vertically positioned adjustable screw member 132 is supported in the member 127 and is secured therein in adjustable position by means of nuts 133. The lower end of the screw member 132 is formed to provide a yoke 134, best shown in Figs. 6 and 7, which yoke is received in and embraced by the multiple yoke end 135 of the lever 136 and is rotatably secured thereto by means of the pin 137. The pin 137 projects inwardly and outwardly past the end surfaces of the multiple yoke end 135 and is received under the fingers 131 which thereby act to confine the end 135 of the lever 136 and the end 134 of the screw 132 in a definite relationship with respect to the lowermost free end of the brake band 114. The end 135 of the lever 136 is provided with projecting portions 138 which engage the abutment 130 on the member 129. The relation of the parts is thus such that if the upper end of the lever 136 is moved to the left, as viewed in Fig. 5, about the axis of the pin 137, the portions or fingers 138 are moved downwardly with respect to the axis of the pin 137, and, acting against the abutment 139, move the free ends of the band away from each other, thus acting to move the brake band 114 into contact with the brake drum 102.

The upper end of the lever 136 is connected to the free end of the lever 126 by means of a link 142 and pins 143 and 144. The link 142 is constantly urged toward the right, as viewed in Fig. 5, by means of a coil spring 145 encircling the link 142 and maintained under compression between the abutment 146 at the right hand end of the link and the washer 147 slidably encircling the link 142 and bearing against the right hand face of the member 105 which is provided with an enlarged opening 148 through which the link 142 projects. The movement of the link 142 to the right is preferably limited by means of a washer such as 149 and pin 150. Springs 151 extending between the hook member 115 and stamped members 152 encircling the bolts 111, constantly act to maintain the brake band 114 out of contact with the drum in the neighborhood of the box 112. A coil spring 153 extending between the lower end of the lever 136 and a pin 154 carried by the band 114 acts to draw the free ends of the band together and thus maintain them out of contact with the drum 102. Yokes 158 similar to the yokes 97 previously described, and carried by the free ends of the member 105, act to maintain the upper and lower portions of the band in proper alignment with the drum 102, and adjustable screws 159 threaded through such ends are provided for limiting the clearance between the band and drum at these points. The lower end of the lever 125 may be connected by a link such as 160 to the brake applying pedal (not shown) or other means actuated by the operator of the vehicle for applying the brakes.

The force exerted by the spring 145 is preferably greater than the force exerted by the springs 151 in order to insure the proper progressive action of the brake mechanism as will hereinafter be described.

The action of this brake is as follows: Assuming the brake mechanism to be in its normal inoperative position as shown and considering a force to be applied to the link 160 to cause operation of the brake, the following action takes place: The lower end of the lever 125 is moved forwardly, tending to turn it about the axis of the pin 120. Two things act to resist this movement, namely the spring 145 and the springs 151. Inasmuch as the spring 145 is of greater force than the springs 151, the upper end of the lever 126 has a tendency to remain stationary. This tendency forces the block 116 towards the open end of the box 112 against the tension of the springs 151, the pin 120 pivoting about the opening 122 to permit this sliding movement. As the block 116 thus moves outwardly it bears against the projection 124 on the block 113 and causes the block 113, and consequently the adjacent portion of the band 114, to move outwardly. This action continues until the forward portion of the band 114 contacts with the drum 102, thereby limiting its movement in that direction. When this occurs, the movement of the block 116 is substantially stopped, and upon further forward movement of the link 160 the double armed lever 125—126 is caused to move about the now relatively fixed axis of the pin 120, with the result that the upper end of the lever 126 is moved rearwardly with the link 142 against the pressure of the spring 145. The link 142 in thus moving rearwardly, moves the upper end of the lever 136 rearwardly, and the ends 138 on the lower yoke end of the lever 135, in bearing against the abutment 130, cause the free ends of the band 114 to separate against the force of the spring 153 and move the band into contact with the drum 102. Upon return of the link 160 to its normal inoperative position, the various parts of the brake mechanism are of course returned to their inoperative position by the force of the various springs.

It will be apparent that in this construction the band is of the wrapping type, and in being anchored midway between its ends is equally effective when the vehicle is moved in either direction.

It will also be apparent that in this construction, as well as in the construction previously described, the anchored point of the brake band is first moved into contact with the drum and is then progressively followed by the remaining portion of the band. The brake band 114 may, of course, be provided with slots 161 in the edge thereof, as in the construction previously described, the distance between the adjacent slots 161 in this case, however, increasing from the block 113 in both directions.

The brake mechanism in this case may of course be applied to the brake drum and be adjusted relative thereto previous to the assembly of the brake drum to the vehicle, as in the case previously described, the brake mechanism being held in expanded position by the employment of a wedge at a suitable point, such as between the upper end of the lever 126 and the brake band 114 during assembly to the vehicle, the bolts 106 and 111 being inserted in place upon assembly to secure the brake mechanism to the axle 103, and necessitating only connection of the link 160 to the lever 125 after securement to the vehicle.

As previously pointed out, in one aspect of the present invention, that is the method of assembling the brake to the vehicle, it is immaterial what particular brake mechanism is employed as long as it is constructed to be applied as described in connection with the present invention, while in another aspect of the present invention, that of the particular brake mechanism herein described, it is relatively immaterial how the mechanism is applied to the vehicle for it is obvious that the brake mechanism herein described may be applied to the vehicle in substantially the same manner as in the conventional methods now generally employed.

Formal changes may be made in the specific embodiment of the invention described without departing from the spirit or substance of the broad invention, the scope of which is commensurate with the appended claims.

What I claim is:

1. In a brake mechanism, in combination, a brake drum, a brake element cooperable therewith, said brake element having a relatively free end and an anchored portion, means for moving said element into contact with said drum, and means, including an element pivoted for movement in a plane approximately parallel to the braking surface of said element at its point of anchorage, dependent upon movement of the first mentioned means for moving said anchored portion of said element into contact with said drum in advance of other portions of said element.

2. In a brake mechanism, in combination, a brake drum, a flexible brake element cooperable therewith, said brake element having a relatively free end and an anchored portion, and means including a resilient member for causing progressive contact of said element with said drum from said anchored portion to said free end.

3. In a brake mechanism, in combination, a brake drum, a relatively flexible brake element cooperable therewith, said brake element having a relatively free end and an anchored portion, and means including a resilient member for first moving said anchored portion of said element into contact with said drum and then each increment of length of said element into contact with said drum progressively from said anchored portion to said free end.

4. In a brake mechanism, in combination, a brake drum, a cooperating brake element having a free end, means anchoring said element at at least one point thereon against circumferential movement relative to said drum, and means for moving said brake element into contact with said drum comprising means for positively and resiliently urging said anchored point into contact with said drum.

5. In combination, a brake drum having an outwardly opening generally channel sectioned rim, and a cooperating brake element disposed in generally nesting relationship with respect to said rim.

6. In combination, a brake drum having an outwardly opening channel sectional rim, and a cooperating brake element within said drum having outwardly disposed portions thereof disposed on either side of the sides of said channel.

7. A brake element of the flexible type comprising a generally circular member adapted to be anchored at one point thereon against relative circumferential movement, said element being formed with a channel section and the sides of said channel being slotted to impart flexibility thereto, the distance between adjacent slots increasing in proportion to the distance from said point of anchorage.

8. In combination, a brake drum, a flexible brake element of the internal expanding type operatively positioned therein, means for moving said brake element into contact with said drum progressively from the point of anchorage of said brake element to the free end thereof, and a friction lining interposed between said brake element and said drum and secured to said drum.

9. In combination, a relatively stationary support, a brake drum rotatable relative to said support, a brake element co-operable with said drum, means carried by said support for anchoring one portion of said element relative to said support, means for moving another portion of said element into contact with said drum, and means including an element pivoted for movement in a plane angularly disposed with respect to the general plane of said drum, dependent upon movement of the last mentioned means, for moving the first mentioned portion of said element into contact with said drum.

10. In combination, a relatively stationary support, a brake drum rotatable relative to said support, a brake element co-operable with said drum, means carried by said support for anchoring one portion of said element against movement circumferentially thereof while permitting radial movement thereof relative to said support, means for moving another portion of said element into contact with said drum, and means including a member mounted for movement in a plane angularly disposed relative to the general plane of said drum, dependent upon movement of the last mentioned means, for resiliently urging the first mentioned portion of said element into contact with said drum prior to contact of the last mentioned portion with said drum.

11. In combination, a relatively stationary support, a brake drum rotatable relative to said support, a brake element co-operable with said drum, means carried by said support permitting radial movement of one portion of said element for positively anchoring said portion of said element circumferentially of said support, means for moving another portion of said element into contact with said drum, and means dependent upon movement of the last mentioned means for resiliently urging the first mentioned portion of said element into contact with said drum prior to contact of the last mentioned portion with said drum.

12. In combination, a relatively stationary support, a brake drum rotatable relative thereto, a brake element operatively positioned relative to said drum, means for anchoring one portion of said element to said support, means for moving another portion of said element into contact with said drum, means for resiliently urging the first mentioned portion into contact with said drum, and an actuating connection for the second mentioned means interconnected with the third mentioned means for causing operation thereof prior to actuation of said second mentioned means.

13. A brake mechanism comprising, in combination, a support, a brake drum rotatable relative thereto, a single brake element operatively positioned relative to said drum, means for anchoring one portion of said element to said support, means for resiliently urging said portion into contact with said drum, means for moving another portion of said element into contact with said drum, and actuating means interconnected between said moving means to actuate one thereof prior to the other thereof.

14. A brake mechanism comprising, in combination, a support, a brake drum rotatable relative thereto, a brake element operatively positioned relative to said drum, means for anchoring one portion of said element to said support, means including an element movable in a plane angularly disposed with respect to said drum for moving said portion into contact with said drum, means for moving another portion of said element into contact with said drum, and actuating means interconnected between said moving means including a member bodily movable with the second mentioned means to actuate the first mentioned moving means prior to actuation of the second mentioned moving means whereby to cause said element to be applied to said drum progressively from the first mentioned portion to the second mentioned portion.

15. In a brake mechanism, in combination, a support, a brake drum rotatable relative thereto, a brake element positioned in operative relation with respect to said drum, means for anchoring one point of said element against circumferential movement with said drum, means for moving a free end of said element into contact with said drum, and means including a resilient member interposed between the last mentioned means and the first mentioned means for resiliently urging said point into contact with said drum.

16. In a brake mechanism, in combination, a support, a brake drum rotatable relative thereto, a brake element positioned in operative relation with respect to said drum, means for anchoring one point of said element against circumferential movement with said drum, a bodily shiftable lever for moving a free end of said element into contact with said drum, and means actuated by bodily shifting of said lever for urging said anchored point into contact with said drum in advance of contact of said free end with said drum.

17. In a brake mechanism, in combination, a support, a brake drum rotatable relative thereto, a brake element positioned in operative relation with respect to said drum, means for anchoring one point of said element against circumferential movement with said drum, means for moving a free end of said element into contact with said drum, means interconnected with the last mentioned means for moving said anchored point into contact with said drum, and resilient means co-operating with the second mentioned means insuring contact of said anchored point with said drum prior to such actuation of said second mentioned means as will be effective for moving said free end of said element into contact with said drum.

18. In a brake mechanism, in combination, a support, a brake drum rotatable relative thereto, a brake element operatively positioned in said drum with its ends in adjacent relationship, means anchoring one of said ends against circumferential movement and permitting radial movement thereof, an operating member, non-compressible means connecting said member and the other end of said element, and resilient means interposed between said member and the first mentioned end.

19. In a brake mechanism, in combination, a support, a brake drum rotatable relative thereto, a brake element operatively positioned in said drum, anchoring means for one end of said element for limiting circumferential movement thereof including a casing fixed to said support and a co-operating member fixed to said end and radially slidable in said casing, an operating element movable in said casing, cam means interposed between said operating element and said member, and a relatively rigid member connecting said operating element and the other end of said brake element.

20. In a brake mechanism, in combination, a support, a brake drum rotatable relative thereto, a brake element operatively positioned in said drum, anchoring means for one end of said element for limiting circumferential movement thereof including a casing fixed to said support and a co-operative member fixed to said end and radially slidable in said casing, an operating element movable in said casing, resilient cam means interposed between said operating element and said member, and a relatively rigid member connecting said operating element and the other end of said brake element.

21. In a brake mechanism, in combination, a support, a brake drum rotatable relative thereto, a brake element operatively positioned in said drum, anchoring means for one end of said element for limiting circumferential movement thereof including a casing fixed to said support and a co-operative member fixed to said end and radially slidable in said casing, a member movable at substantially right angles to the first mentioned member and engageable with the other end of said brake element, and means movably associated with said casing for moving both of said members toward said drum.

22. In a brake mechanism, in combination, a support, a brake drum rotatable relative thereto, a brake element operatively positioned in said drum, a casing fixed to said support and provided with an opening in its radially outward end and an opening in a side wall thereof, a member fixed to one end of said brake element and radially slidably received in said casing through the first mentioned opening, a plunger slidably projecting through the other of said openings and operatively associated with the other end of said brake element, and an actuating element movably received in said casing for moving both of said members.

23. In a brake mechanism, in combination, a support, a drum rotatable relative thereto, a brake element operatively associated with said drum, radially movable means anchoring one portion of said element against circumferential movement, a bodily movable lever associated with said means for urging said anchored portion radially into contact with said drum, means for moving another portion of said element into contact with said drum, means operatively connecting said lever with the last mentioned means, and means for actuating said lever.

24. In a brake mechanism, in combination, a support, a drum rotatable relative thereto, a brake element operatively associated with said drum, radially movable means anchoring one portion of said brake element, a member pivoted for movements towards and away from said means and operatively associated therewith, a lever carried by said member and operable to cause said member to urge said means toward said drum, means for moving another portion of said element into contact with said drum, means operatively connecting said lever with the last mentioned means, and means for actuating said lever.

25. In a brake mechanism, in combination, a support, a drum rotatable relative thereto, a brake element operatively associated with said drum, radially movable means anchoring one portion of said element against circumferential movement, a bodily movable lever associated with said means for urging said anchored portion radially into contact with said drum, means for moving another portion of said element into contact with said drum, means operatively connecting said lever with the last mentioned means, means for actuating said lever and resilient means limiting initial movement of said lever to actuation of said pivoted member.

EMIL A. NELSON.